US008022343B2

(12) United States Patent
Solenne

(10) Patent No.: US 8,022,343 B2
(45) Date of Patent: Sep. 20, 2011

(54) AIMING SYSTEM WITH INTEGRATED DEVIATION METER

(75) Inventor: Thierry Solenne, Bures sur Yvette (FR)

(73) Assignee: MBDA France, Paris (FR)

( * ) Notice: Subject to any disclaimer, the term of this patent is extended or adjusted under 35 U.S.C. 154(b) by 195 days.

(21) Appl. No.: 12/513,489

(22) PCT Filed: Nov. 15, 2007

(86) PCT No.: PCT/FR2007/001876
§ 371 (c)(1),
(2), (4) Date: May 4, 2009

(87) PCT Pub. No.: WO2008/062114
PCT Pub. Date: May 29, 2008

(65) Prior Publication Data
US 2010/0012765 A1    Jan. 21, 2010

(30) Foreign Application Priority Data

Nov. 21, 2006    (FR) .................................. 06 10165

(51) Int. Cl.
*F41G 7/00* (2006.01)
*F42B 15/00* (2006.01)

(52) U.S. Cl. ...... 244/3.1; 244/3.11; 244/3.13; 244/3.15; 244/3.16; 356/138; 356/140; 356/141.2; 356/141.5; 356/614; 356/615; 356/620

(58) Field of Classification Search .......... 244/3.1–3.19; 89/1.11, 1.1; 342/52–55, 59, 61–66, 175, 342/195; 73/760, 788, 800; 250/200, 206, 250/206.1–206.3, 559.01, 559.29, 559.33; 356/138, 139.03, 140, 141.1–141.5, 614, 356/615, 620
See application file for complete search history.

(56) References Cited

U.S. PATENT DOCUMENTS

| 4,040,744 | A | * | 8/1977 | Schertz et al. | ............... | 244/3.16 |
| 4,419,012 | A | * | 12/1983 | Stephenson et al. | ........ | 356/141.5 |
| 4,424,943 | A | * | 1/1984 | Zwirn et al. | .................. | 244/3.11 |
| 4,710,028 | A |   | 12/1987 | Grenier | | |
| 4,797,557 | A | * | 1/1989 | Ohman | .................... | 250/559.33 |
| 4,847,481 | A | * | 7/1989 | Altmann | .................... | 250/206.1 |
| 4,881,809 | A | * | 11/1989 | Thierry | .................... | 356/141.1 |
| 4,932,777 | A | * | 6/1990 | Fodale et al. | .............. | 356/141.5 |
| 5,023,845 | A | * | 6/1991 | Crane et al. | ..................... | 73/800 |
| 5,068,522 | A | * | 11/1991 | Falp et al. | ................. | 250/206.1 |
| 5,081,345 | A |   | 1/1992 | Grenier | | |

(Continued)

FOREIGN PATENT DOCUMENTS

| EP | 0 206 912 | 12/1986 |
| EP | 0 425 355 | 5/1991 |
| EP | 0 633 457 | 1/1995 |
| EP | 0 740 123 | 10/1996 |

OTHER PUBLICATIONS

International Search Report dated May 8, 2008 w/ English translation.

(Continued)

*Primary Examiner* — Bernarr Gregory
(74) *Attorney, Agent, or Firm* — Dickinson Wright PLLC

(57) ABSTRACT

According to the invention, the system comprises an infrared detector (7) for alternately generating images (5') of sources of light (5) in the near infrared emitted by a missile flying towards a target and thermal images of the observed scene, said thermal images being visible on the display means (11).

16 Claims, 4 Drawing Sheets

U.S. PATENT DOCUMENTS

| | | | | |
|---|---|---|---|---|
| 5,085,507 | A | * | 2/1992 | Williams et al. .......... 356/139.03 |
| 5,196,900 | A | * | 3/1993 | Pettersen .................... 356/141.5 |
| 5,227,619 | A | * | 7/1993 | Vilaire et al. .............. 356/141.5 |
| 5,229,594 | A | * | 7/1993 | Vilaire et al. .............. 356/141.2 |
| 5,400,134 | A | * | 3/1995 | Obkircher ................... 356/141.5 |
| 5,430,290 | A | | 7/1995 | Merle |
| 5,640,241 | A | * | 6/1997 | Ogawa ........................ 356/141.5 |
| 5,708,583 | A | | 1/1998 | Solenne |
| 5,762,290 | A | * | 6/1998 | Dupont ........................ 244/3.15 |
| 6,003,810 | A | * | 12/1999 | Roze des Ordons et al. ......... 244/3.16 |
| 7,410,119 | B2 | * | 8/2008 | Leon et al. .................... 244/3.11 |
| 7,474,856 | B2 | * | 1/2009 | Teneze et al. ................. 244/3.11 |
| 7,492,308 | B2 | * | 2/2009 | Benayahu et al. ............... 342/52 |
| 7,582,853 | B2 | * | 9/2009 | Teneze ........................... 244/3.1 |
| 2002/0154293 | A1 | | 10/2002 | Wells |

OTHER PUBLICATIONS

Written Opinion of the International Searching Authority with English translation.

Written Opinion of the International Searching Authority dated Aug. 5, 2008 with English Translation.

\* cited by examiner

AIMING SYSTEM WITH INTEGRATED DEVIATION METER

FIELD OF THE INVENTION

The present invention relates to an aiming system with integrated deviation meter. Such a system is particularly appropriate to the locating of missiles in flight in order to guide them to a target, such as an armored vehicle or a bunker.

BACKGROUND OF THE RELATED ART

The document U.S. Pat. No. 4,710,028 (EP-0 206 912) discloses a deviation meter making it possible to locate a missile flying at least approximately in the direction of a target and to which is linked an optical emitter generating successive light flashes in the near infrared, said deviation meter comprising:
- an optical detector comprising a matrix of photosensitive elements able to detect said successive light flashes;
- an optical system, which observes the scene in which the target and said missile are located and in the focal plane of which is positioned said optical detector;
- electronic means of controlling said optical detector that are able to trigger snapshots of said scene by the latter; and
- means able to synchronize snapshots of said optical detector with said successive light flashes.

Thus, in such a known deviation meter, the position in said matrix of the photosensitive element or elements excited by said successive light flashes is representative of the position of said missile relative to the axis of said optical system.

When such a deviation meter is used in an alignment-guided missile firing station, it is associated with a daytime aiming device (telescope) and/or a nighttime aiming device (heat-sensitive camera) for the use of the operator of said firing station. There is thus obtained a composite aiming system with deviation meter enabling said operator to follow a target with one or other of said aiming devices depending on the conditions of brightness, the deviation meter supplying position information concerning the missile in flight to means of guiding the latter to said target.

In such a composite aiming system, there is therefore a deviation measurement channel and at least one aiming channel, each of said channels having its own optical system, its own detector and its own electronics (heat-sensitive aiming), and so on, which renders said system complex, costly, heavy and voluminous. Such drawbacks are particularly disadvantageous when said composite aiming system is to be carried by the operator.

These drawbacks of complexity, cost, weight and bulk are added to by the fact that it is necessary to provide, for the deviation meter channel, a wide-field optical channel for the control of the missile by the firing station after launch and a reduced-field optical channel for guidance.

Moreover, in such a composite aiming system, it is essential for performance purposes for the axes of the deviation measurement and aiming channels to be strictly harmonized and remain so throughout the duration of use, which entails precision adjustments or even an additional optical harmonization device, and means that the system has to be used with care, although the conditions of use do not normally allow that.

Furthermore, the daytime aiming device (telescope) forms a direct optical channel able to transmit a laser attack to the operator.

Finally, because, in such a composite aiming system with deviation meter, the missile is servo-controlled to the line of sight of the daytime aiming device or to that of the nighttime aiming device, the guidance of the missile is very sensitive to the untimely or ill-controlled movements that the operator imparts on said system (for example, when jettisoning the missile from its launch tube, when tracking a target with strong defilade, difficulties while aiming, etc.). The result is a disturbed guidance for the missile which, possibly, may even leave the field of said system.

SUMMARY OF THE INVENTION

The subject of the present invention is an aiming system with integrated deviation meter making it possible to overcome the abovementioned drawbacks.

To this end, according to the invention, the aiming system able to be directed towards a target and comprising a deviation meter of the type reviewed hereinabove is noteworthy in that:
- said optical detector is an infrared detector sensitive not only to the near infrared in the emission spectrum of the optical emitter associated with the missile, but also to the mid-infrared between 3 and 5 micrometers;
- said photosensitive elements of said infrared detector have, by means of an appropriate optical system, an angular resolution at least as good as 0.3 mrad, preferably as good as 0.1 mrad;
- said electronic control means trigger snapshots of said scene by said infrared detector not only in synchronism with said light flashes, but also in the intervals between said successive light flashes; and
- viewing means are provided to view the images resulting from the snapshots taken in said intervals between said successive light flashes.

Thus, in the system according to the present invention, the images in the mid-infrared constitute thermal images of the observed scene, able to be used for daytime aiming and nighttime aiming. The daytime aiming device and the nighttime aiming device are therefore no longer necessary.

The system according to the invention therefore no longer comprises more than a single channel for the locating, daytime aiming and nighttime aiming functions, so that its optical, electronic and mechanical components are significantly simplified, more compact and more lightweight, which makes it possible to obtain a firing station that can easily be carried by a foot soldier and is significantly less expensive than the current firing stations. The harmonization of the daytime/nighttime aiming channels and of the locating channel is perfect, since there is now only a single optical axis, which eliminates any residual defect and so avoids a complex opto-mechanical architecture to guarantee the harmonization performance, particularly in terms of temperature, or a temperature correction device, as was needed in the prior solutions. The elimination of any harmonization defect (bias) between the aiming and the guidance enhances the guidance accuracy of the system.

Moreover, because the matrix of the infrared detector comprises a large number of photosensitive elements (pixels) of high resolution (at least 388×284, but preferably 640×512 and even 1280×1024 to ensure a correct identification of the target before firing and a high guidance accuracy), the system according to the invention can comprise only a single field of view (of the order of 6° to 8°), used both for controlling the missile on its launch and guiding said missile to the target.

Furthermore, in the system according to the invention, there is no direct aiming channel, so that the eye of the operator is protected from laser attacks.

Preferably, the matrix of said infrared detector consists of photosensitive elements made of indium antimonide or of mercury and cadmium telluride.

Advantageously, the time separating a snapshot in an interval between two successive light flashes and a snapshot in synchronism with one of the latter is at most equal to 15 milliseconds. Thus, these two snapshots can be considered to be simultaneous.

In a known manner, said infrared detector forms the images by integration and consecutive reading and the integration time of the images corresponding to snapshots in synchronism with said light flashes is chosen to be at most equal to 200 microseconds, whereas the integration time of the images corresponding to snapshots in the intervals between said successive light flashes is advantageously between 1 and 5 milliseconds.

Preferably, said infrared detector operates in IWR (integrate while read) mode so that, while reading each image corresponding to a snapshot in synchronism with a light flash, said electronic control means can trigger an additional snapshot of said scene giving rise to an additional image at least approximately identical (except with respect to the image of said light flash) to said image corresponding to a snapshot in synchronism with a light flash. An image processor is then provided that is able to compare the latter image and said additional image to unambiguously deduce therefrom the position of the image of said missile on said detector. In practice, the difference between these two images makes it possible to retain, in the difference image, only the information concerning the light flash (that is the missile) while eliminating the jamming sources and false emissions (solar effects, for example).

It will be noted that, thanks to the present invention, the images of said flashes and of the target are acquired quasi-simultaneously on said infrared detector, which allows for the automatic differential pursuit of the missile to the target, thus avoiding the drawbacks due to the movements of the operator, in particular for missiles fired from a shoulder. The system according to the present invention then comprises a computer computing the differential deviation measurement between said missile and said target from information delivered by said infrared detector and relating to the respective positions, on said matrix, of the images corresponding to snapshots in synchronism with said successive light flashes and images corresponding to snapshots in the intervals between said light flashes.

Said means able to synchronize the snapshots of said infrared detector with said successive light flashes can be temporary or permanent. Moreover, said light flashes can be triggered from said missile or from said infrared detector. In the latter case, said electronic control means of the infrared detector can be able to control the optical emitters of at least two missiles in order for said optical emitters to generate interleaved series of light flashes.

BRIEF DESCRIPTION OF THE DRAWINGS

The figures of the appended drawing will clearly show how the invention can be implemented. In these figures, identical references designate similar elements.

DETAILED DESCRIPTION OF THE INVENTION

Figure 1:
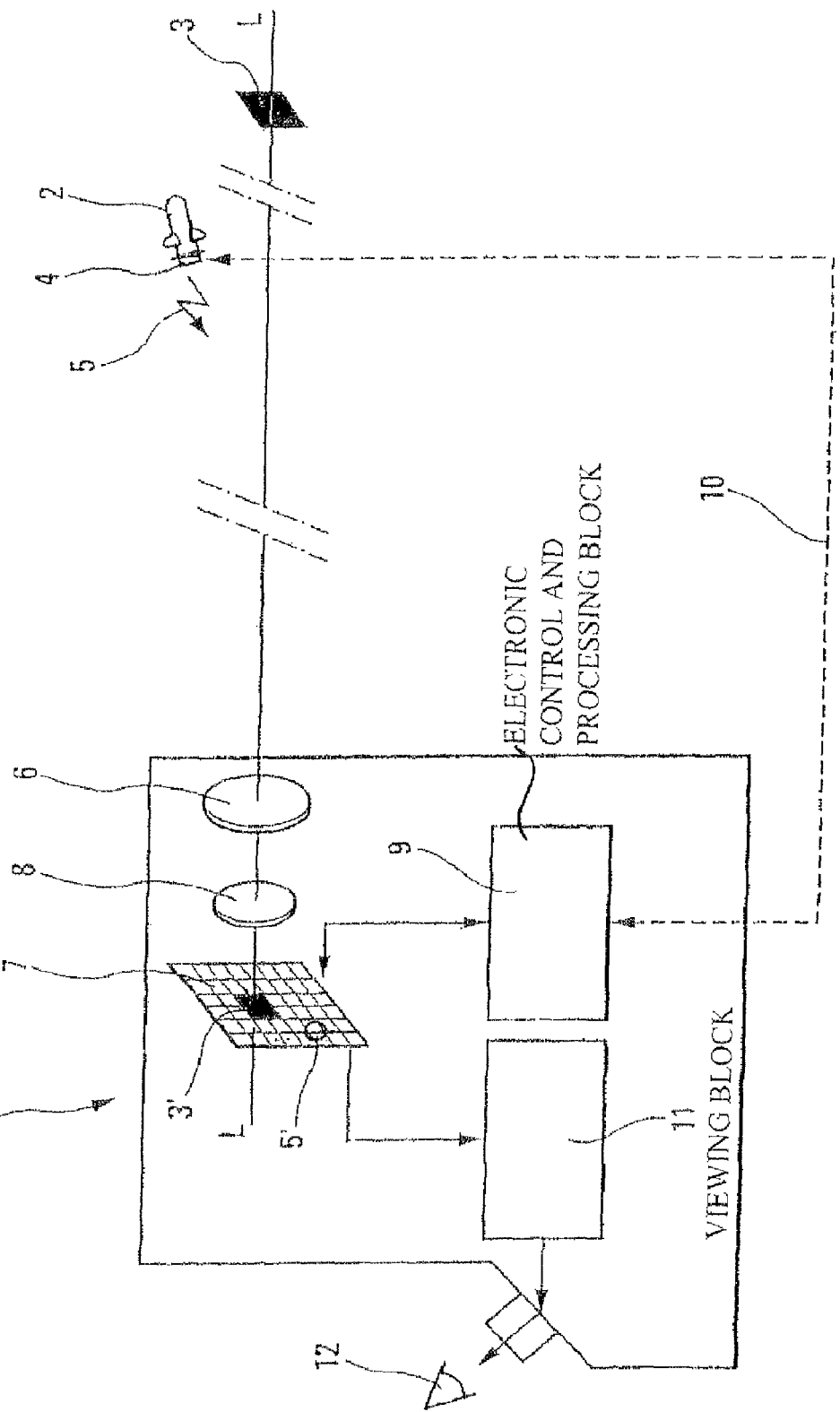
FIG. 1 shows the block diagram of an aiming system according to the present invention.

The daytime/nighttime aiming system with integrated deviation meter 1, according to the present invention and represented in FIG. 1, is designed for the alignment guidance of a missile 2 to a target 3. It comprises a single axis L-L, at least approximately pointing towards said target 3.

The missile 2 is equipped with an optical emitter 4, generating light flashes 5 in the near infrared. Said optical emitter 4 can be a flashing beacon (xenon lamp, laser diode, etc.) or even a simple element reflecting light flashes from a fixed beacon to the system 1.

The aiming system 1 comprises a single optical system with the axis L-L and, in the focal plane of the latter, a flat infrared detector 7, at least approximately orthogonal to said axis L-L of the system 1. A dual bandpass filter 8 is arranged between the optical system 6 and the infrared detector 7.

The infrared detector 7 comprises, for example, a matrix of photosensitive elements made of indium antimonide or of mercury and cadmium telluride, arranged in a Dewar flask linked to a cooling device that is not represented. The filter 8 can also be of the cooled type and it can be housed in the cooler of the detector 7.

The infrared detector 7 comprises a high number of photosensitive elements, for example 640×512 or 1280×1024, and it can operate in "snapshot" mode, that is, all the photosensitive elements integrate at the same moment the portion of scene that they are observing. The detector 7 has a field of the order of 6° to 8° and an angular resolution at least as good as 0.3 mrad, preferably 0.1 mrad.

Furthermore, the infrared detector 7 is able to operate in IWR mode, that is, it can integrate an image while the preceding image is being read.

The infrared detector 7 is sensitive both in the mid-infrared corresponding to the spectral window of 3 to 5 μm to be able to form thermal images and in the near infrared emitted by the light flashes 5. The spectral selectivity is provided by the filter 8. In the near infrared, the bandwidth of the filter 8 is precisely adapted to the spectral emission band of the light flashes 5, which makes it possible to largely eliminate the radiation from the observed scene and therefore guarantee a high signal/noise ratio during the snapshots of the light flashes 5. In the mid-infrared, the bandwidth of the filter 8 is precisely adapted to the spectral response of the detector 7, to allow for thermal aiming with a good level of sensitivity.

The aiming system 1 comprises an electronic control and processing block 9 allowing in particular for snapshots 3' of the target 3 and snapshots 5' (representative of the missile 2) of the flashes 5 emitted by the emitter 4 by the infrared detector 7. A synchronization (symbolized by the dotted line 10 in the figures) between the electronic block 9 and the emitter 4 allows for snapshots 5' during the short duration of the light flashes 5 (from a few microseconds to a few tens of microseconds).

A viewing block 11, for example of the monitor type, is incorporated in the aiming system 1 and is able to provide an operator 12 with the thermal image in the mid-infrared of the scene in which the target 3 is located.

Figure 2:
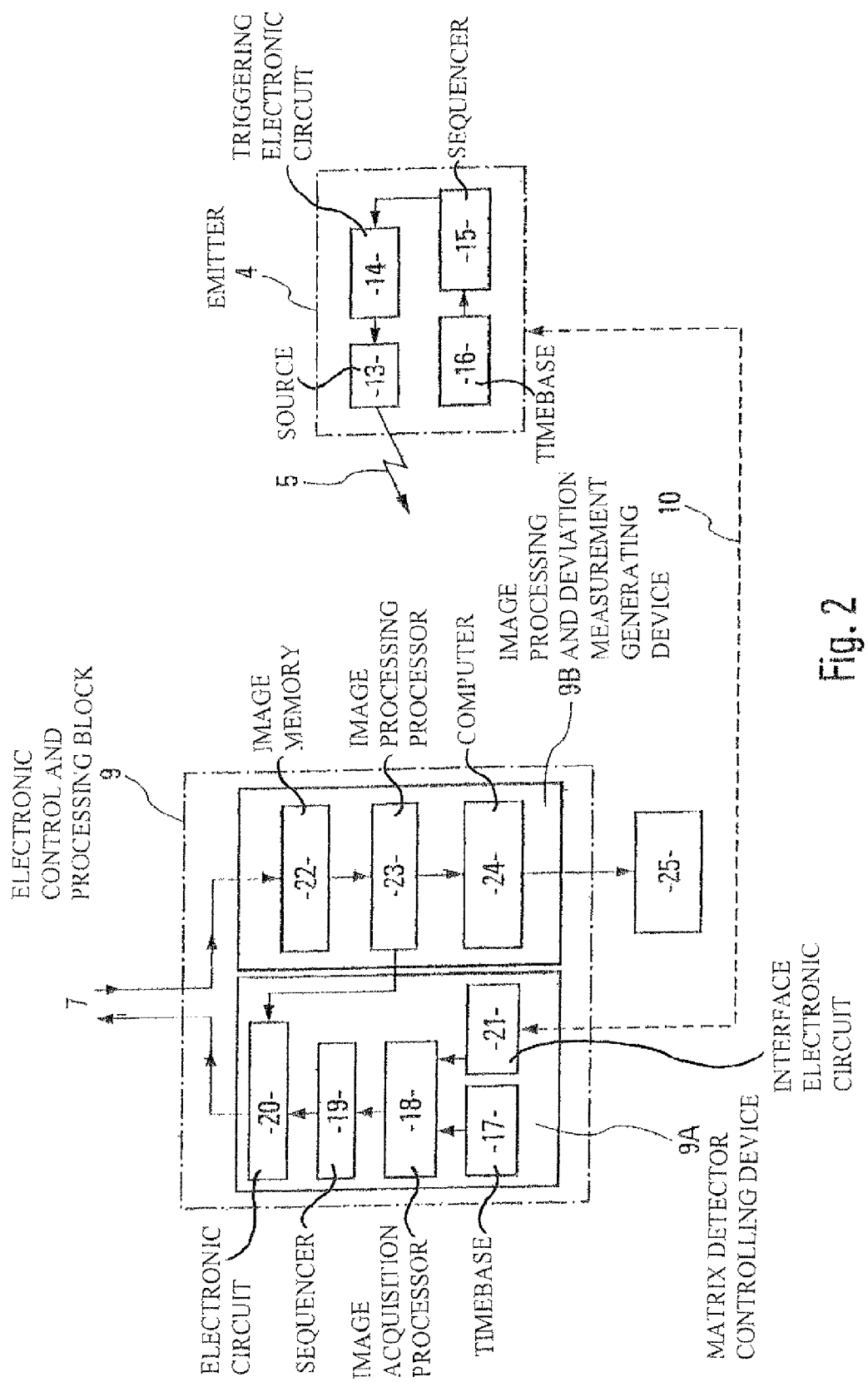
FIG. 2 is a block diagram illustrating an exemplary embodiment of the electronic control and processing block of the infrared detector and of the missile's optical emitter.

As illustrated by FIG. 2, the optical emitter 4 comprises a source 13 (xenon lamp, laser diode, etc.) generating flashes 5 and controlled by a triggering electronic circuit 14, itself controlled by a sequencer 15 driven by a timebase 16.

In the embodiment of FIG. 2, the electronic control and processing block 9 comprises a device 9A for controlling the matrix detector 7 and a device 9B for processing images and generating deviation measurements.

A device 9A comprises a timebase 17, linked to an image acquisition processor 18, which drives the sequencer 19 of the detector 7. The sequencer 19 controls the electronic circuit 20 implementing the latter. An interface electronic circuit 21 enables snapshots of the detector 7 to be synchronized with the light flashes 5, thanks to the link 10 that exists between the emitter 4 and the block 9. The synchronization link 10 can be set up before firing the missile 2 and be maintained during the flight of the latter by the stability of the timebases 16 and 17. It can also be set up by radio link or by a cable which is unwound as the missile 2 advances.

The device 9B comprises an image memory 22, linked to the detector 7, and an image processing processor 23 linked with the memory 22 and controlling a computer 24 measuring differential deviation between the missile 2 and the target 3. The computer 24 controls a computer 25 for guiding the missile 2.

Figure 3:
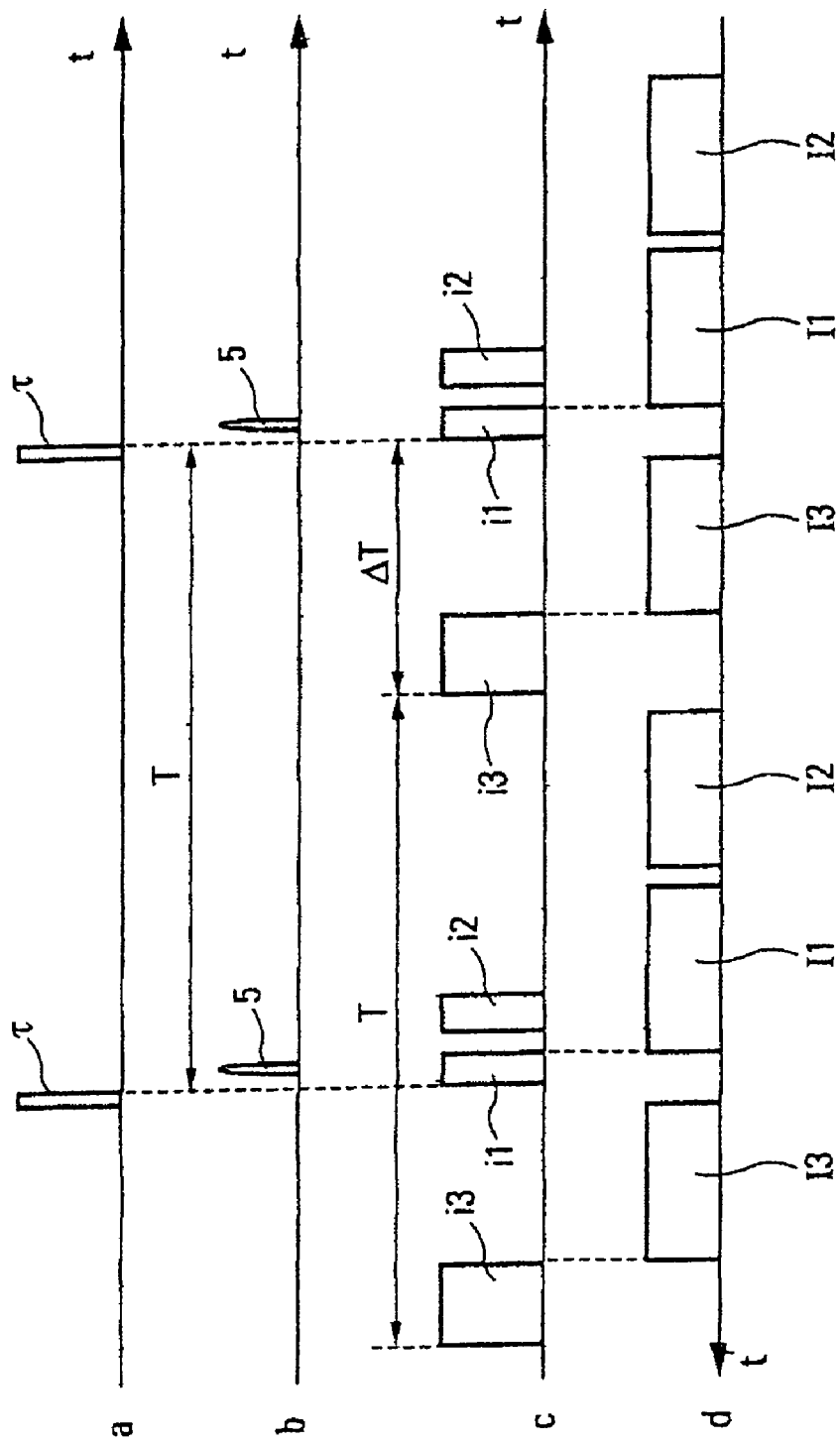
FIG. 3 shows, as a function of time t, four timing diagrams illustrating one operating mode of the aiming system according to the invention.

The timing diagrams of FIG. 3 illustrate an example of how the system 1 of FIGS. 1 and 2 operates. In the timing diagram a of this FIG. 3, pulses τ are represented, emitted by the triggering electronic circuit 14 and resulting in the emission of the flashes 5 by the source 13 (see timing diagram b). Two pulses τ, or two flashes 5, that are consecutive are separated by a time T, possibly with a period of the order of 40 to 50 ms.

In synchronism with the emission of each pulse τ, the device 9A opens an integration window i1 of several tens of μs, enabling the detector 7 to integrate the scene that it observes through the optical system 6 and which comprises the corresponding flash 5 (see timing diagram c).

During the reading of each image I1, integrated during an integration window i1, the device 9A opens another integration window i2, preferably identical to the integration window i1, but temporally slightly offset relative to the corresponding pulse τ. The image I2 corresponding to an integration window i2 therefore represents the same scene as the associated image I1, but without the image 5' of the flash 5. Consequently, the difference image I1-I2 formed in the device 9B comprises only the image of the flash 5 and completely eliminates the scene in which the target 3 and the missile 2 are located, including any jammers that might be located therein.

Moreover, at a temporal distance ΔT from the integration windows i1 (at most 15 ms), the device 9A opens long integration windows i3, for example with a duration of 0.5 ms to 5 ms, to form images I3 of the scene comprising the target 3 and able to form the thermal images displayed on the viewing block 11.

Thus, on the infrared detector 7, there are formed, at very close instants, the images 5' and 3' respectively representative of the missile 2 and of the target 3. The distance separating said images on said detector 7 is therefore known, which enables the computer 24 to calculate the differential deviation measurement between the missile 2 and the target 3 and consequently control the guidance computer 25. It is therefore possible to eliminate guidance errors originating from untimely movements applied to the aiming system 1, both by the operator and by the firing of the missile 2. Furthermore, thanks to such a differential deviation measurement, the operator can, before firing the missile 2, accurately select within the target 3 a desired point of impact, to which the missile will be guided.

Figure 4:
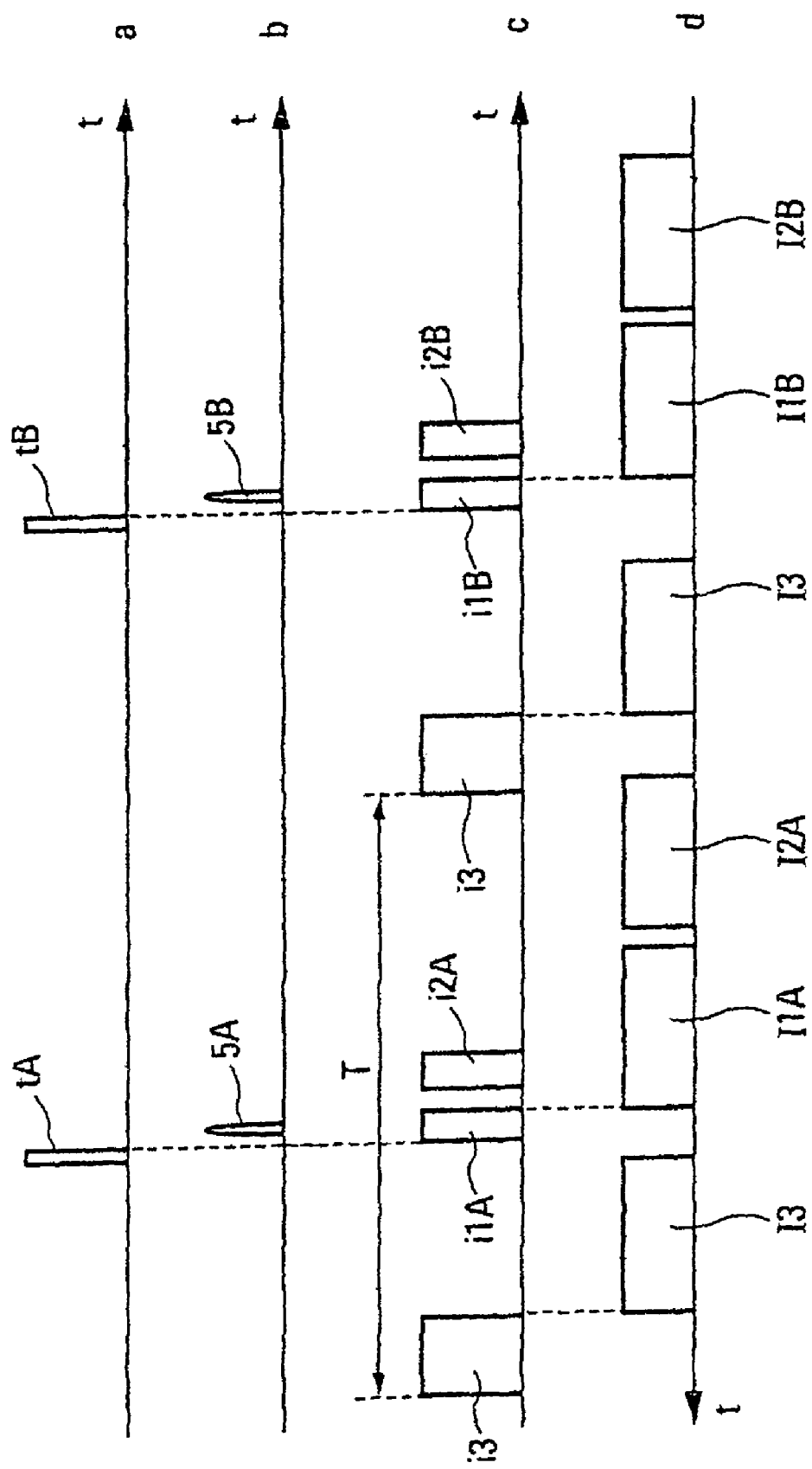
FIG. 4 also shows four time diagrams illustrating an operating variant of the aiming system according to the invention.

In the operating example illustrated by the timing diagrams of FIG. 4, the triggerings of the flashes 5 and of the snapshots are no longer controlled by the pulses τ emitted by the triggering electronic circuit 14 of the optical emitter 4, but by pulses emitted by the timebase 17 of the device 9A controlling the infrared detector 7. It is then possible to simultaneously guide two missiles 2 to one or two targets 3. In FIG. 4, it is assumed that:

the timebase 17 emits successive triggering pulses tA for the source 13 of a missile 2A (not represented) emitting flashes 5A;

the timebase 17 emits successive triggering pulses tB, inserted into the pulses tA and triggering the source 13 of a missile 2B (not represented) emitting flashes 5B;

in a manner similar to the above description regarding the integration windows i1, i2 and the images I1, I2, the infrared detector 7:

opens integration windows i1A to form images I1A of the scene in which the missile 2A is located during the flashes 5A, opens integration windows i2A to form images I2A of the scene in which the missile 2A is located between the flashes 5A, forms difference images I1A-I2A, opens integration windows i1B to form images I1B of the scene in which the missile 2B is located during the flashes 5B, opens integration windows i2B to form images I2B of the scene in which the missile 2B is located between the flashes 5B, forms difference images I1B-I2B, and in a manner similar to the description regarding FIG. 3, the infrared detector 7 forms the thermal images I3 of the scene, integrated during the intermediate integration windows i3.

In light of the above description, it will be understood that the missiles 2A and 2B can thus be guided to one and the same target or two different targets, by differential deviation measurements based on the positions of the images of said missiles and of said targets on said infrared detector 7.

The invention claimed is:

1. An aiming system to be directed towards a target and comprising a deviation meter operable to locate at least one missile flying at least approximately in the direction of said target and to which is linked an optical emitter generating successive light flashes in the near infrared, said deviation meter comprising:

an optical detector comprising a matrix of photosensitive elements operable to detect said successive light flashes;

an optical system, which observes the scene in which said target and said missile are located and in the focal plane of which is positioned said optical detector;

an electronic control section that controls said optical detector and that is operable to trigger snapshots of said scene by the latter; and a synchronization section that synchronizes snapshots of said optical detector with said successive light flashes, wherein:

said optical detector is an infrared detector sensitive not only to the near infrared in the emission spectrum of the optical emitter associated with the missile, but also to the mid-infrared between 3 and 5 micrometers;

said photosensitive elements of said infrared detector have an angular resolution at least as good as 0.3 mrad;

said electronic control section triggers snapshots of said scene by said infrared detector not only in synchronism with said light flashes, but also in the intervals between said successive light flashes; and a viewing section is provided to view the images resulting from the snapshots taken in said intervals between said successive light flashes.

2. The system as claimed in claim 1, wherein the angular resolution of said photosensitive elements is at least as good as 0.1 mrad.

3. The system as claimed in claim 1, wherein said matrix of the infrared detector comprises at least 640×512 photosensitive elements.

4. The system as claimed in claim 3, wherein said matrix of the infrared detector comprises 1280×1024 photosensitive elements.

5. The system as claimed in claim 1, wherein the matrix of said infrared detector comprises photosensitive elements made of indium antimonide.

6. The system as claimed in claim 1, wherein the matrix of said infrared detector comprises photosensitive elements made of mercury and cadmium telluride.

7. The system as claimed in claim 1, wherein the time separating a snapshot in an interval between two successive light flashes and a snapshot in synchronism with one of the latter is at most equal to 15 milliseconds.

8. The system as claimed in claim 1, wherein the integration time of the images corresponding to snapshots in synchronism with said light flashes is at most equal to 200 microseconds.

9. The system as claimed in claim 1, wherein the integration time of the images corresponding to snapshots in the intervals between said successive light flashes is between 1 and 5 milliseconds.

10. The system as claimed in claim 1, in which said infrared detector forms images by integration and consecutive reading, wherein, while reading each image corresponding to a snapshot in synchronism with a light flash, said electronic control section triggers an additional snapshot of said scene giving rise to an additional image at least approximately identical to said image corresponding to a snapshot in synchronism with a light flash and an image processor is provided that is operable to compare the latter image and said additional image to deduce therefrom the position of the image of said missile on said detector.

11. The system as claimed in claim 1, further comprising a computer that computes the differential deviation measurement between said missile and said target from information delivered by said infrared detector and relating to the respective positions, in said matrix, of images corresponding to snapshots in synchronism with said successive light flashes and images corresponding to snapshots in the intervals between said light flashes.

12. The system as claimed in of claim 1, wherein said synchronization section operable to synchronize the snapshots of said infrared detector with said successive light flashes are temporary.

13. The system as claimed in of claim 1, wherein said synchronization section operable to synchronize the snapshots of said infrared detector with said successive light flashes are permanent.

14. The system as claimed in claim 1, wherein said light flashes are triggered from said missile.

15. The system as claimed in claim 1, wherein said light flashes are triggered from said electronic control section of said infrared detector.

16. The system as claimed in claim 15, wherein said electronic control section is operable to control the optical emitters of at least two missiles in order for said optical emitters to generate interleaved series of light flashes.

* * * * *